M. G. HUSTED.
AUTOMATIC FEED AND REVERSE FOR LATHES.
APPLICATION FILED SEPT. 17, 1920.

1,393,131.

Patented Oct. 11, 1921.
2 SHEETS—SHEET 1.

Inventor
Monroe G. Husted.

Knight Bros.
By
Attorney

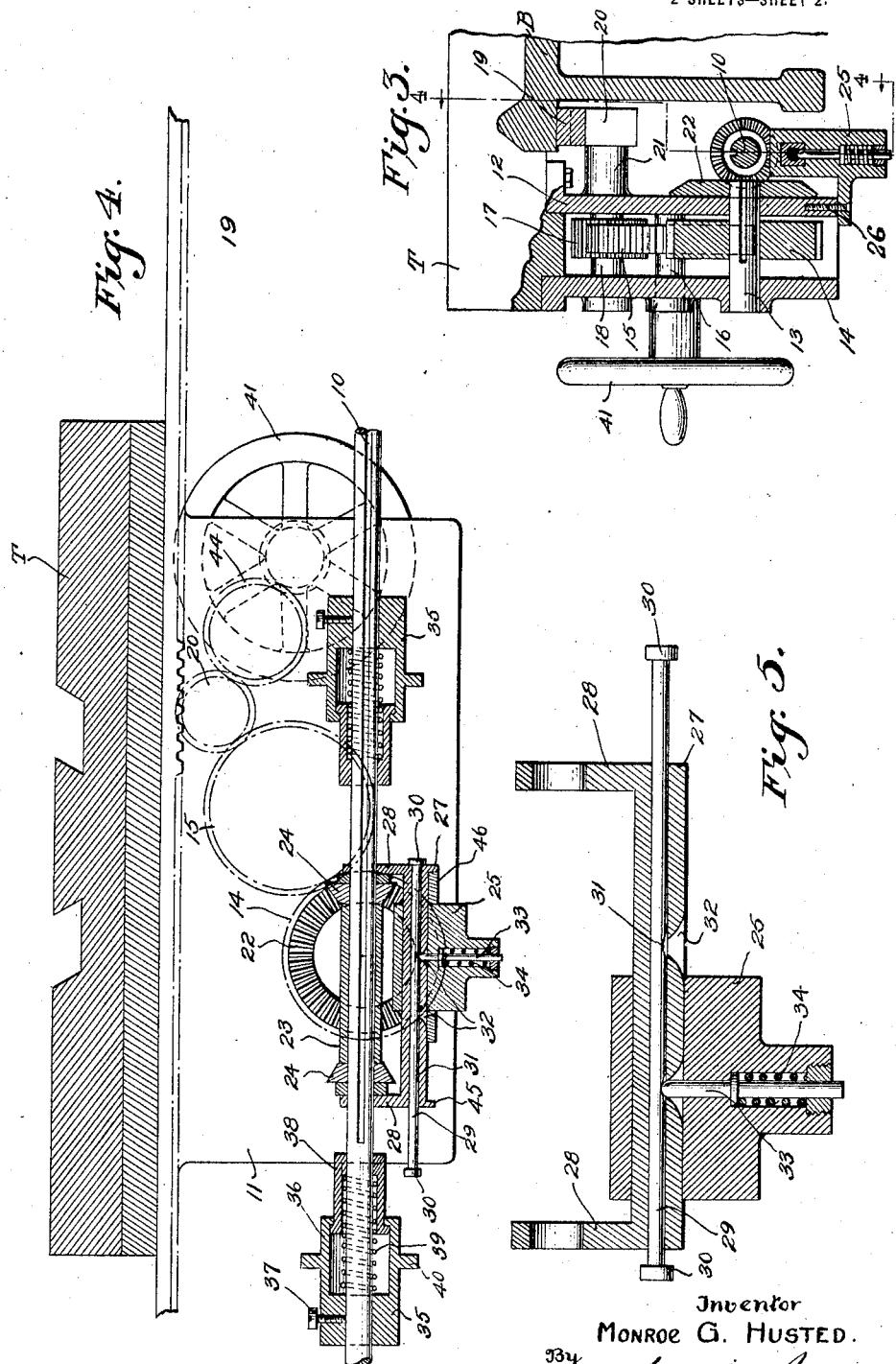

UNITED STATES PATENT OFFICE.

MONROE G. HUSTED, OF BRIDGETON, NEW JERSEY.

AUTOMATIC FEED AND REVERSE FOR LATHES.

1,393,131.    Specification of Letters Patent.    Patented Oct. 11, 1921.

Application filed September 17, 1920. Serial No. 410,948.

*To all whom it may concern:*

Be it known that I, MONROE G. HUSTED, a citizen of the United States, and resident of Bridgeton, in the county of Cumberland and State of New Jersey, have invented certain new and useful Improvements in Automatic Feeds and Reverses for Lathes, of which the following is a specification.

This invention relates to automatic feed and reverse for lathes, and more particularly to mechanism whereby a traveling cutter upon a lathe may be caused to advance toward the work and at a predetermined time to move in an opposite direction during its cutting operation.

The invention contemplates a constantly driven power shaft and a train of gears mounted within a movable casing or apron. This apron is rigidly formed with a part of the lathe structure upon which the cutting tool is mounted, and as power is applied to the train of gears through the medium of the constantly rotating power shaft, the apron and gears are caused to travel longitudinally of the lathe and power shaft and at a predetermined time to reverse their line of travel. This automatic reversal is occasioned when the apron with the gears reaches the end of its travel in either direction, thereby causing the cutter to constantly travel along the work in both directions.

In an automatic reverse it is necessary that the mechanism which shifts the gears to cause the reverse be quick and postive. In order to provide a structure which will adequately meet the requirements of this type of automatic reverse, I position upon the main driving shaft two pairs of telescopic housings, in each pair of which a spring is placed. During the travel of the casing along the shaft it comes in contact with one or the other of these pairs of housings and acts upon them in a manner which moves one of the housings within the other, and consequently compresses the spring, thereby building up a pressure which at the proper moment will forcibly snap the gear-shifting mechanism to position the gears to cause a reverse feed of the casing.

Another feature of my improved structure is the automatic lock and release mechanism. It is likewise essential in a mechanism of this sort to provide means for positively retaining the gears in their shifted positions, as a slight relative movement between the shiftable gears and the stationary gear will tend to disengage them and thereby destroy the value of the device. To overcome any such objection, I have provided a latch mechanism which will securely lock the shiftable gears in their shifted position, but which will preliminarily partly release them to enable the gears to be quickly shifted at the proper time.

Various other features of my invention will be made more apparent in the specification and drawings, in which—

Fig. 3 is a section taken on line 3—3 of Fig. 1;

Fig. 4 is a section taken on line 4—4 of Fig. 3; and

Fig. 5 is an enlarged detail sectional view of the latch mechanism.

Figure 1:
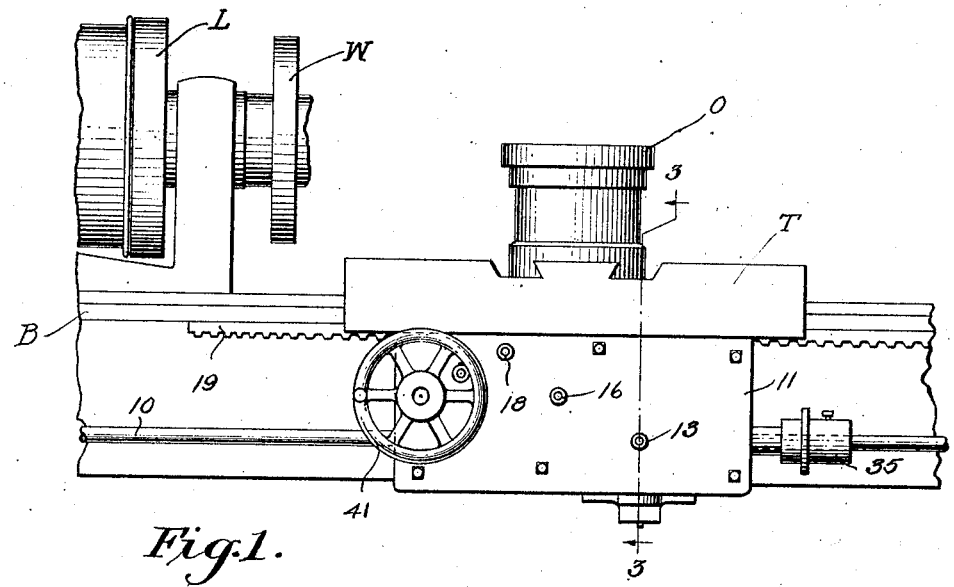
Figure 1 is a side elevation of a portion of a lathe with my invention attached thereto.
Figure 2:
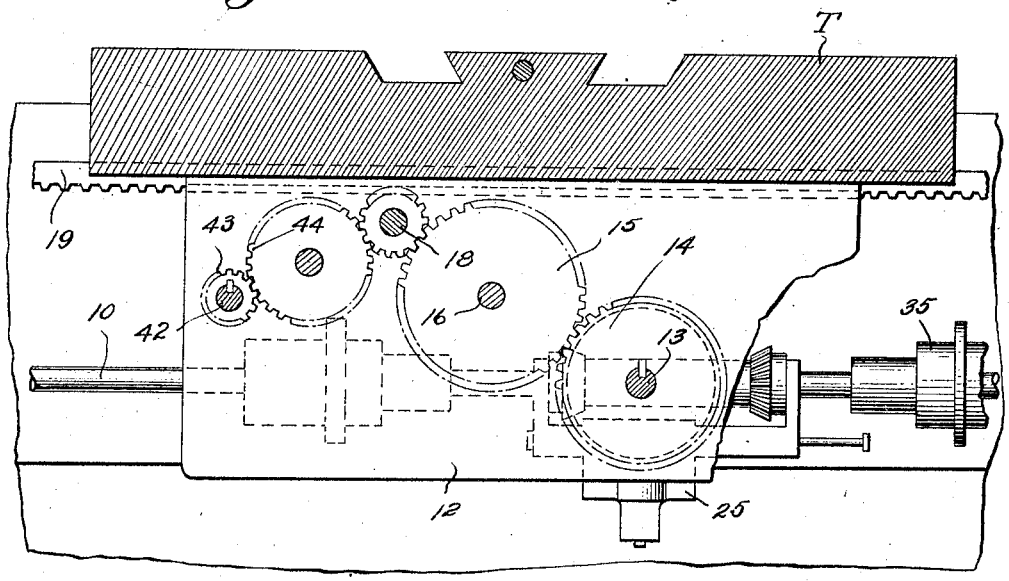
Fig. 2 is an enlarged sectional view of the particular mechanism forming the basis of my invention, with certain of the parts broken away.

Referring now more particularly to the drawings, L indicates a lathe of any ordinary construction, B the bed of the lathe, and W the rotatable work holder. O indicates a tool holder, which is mounted upon a movable table T. Mechanism for cross-feeding the tool holder O is not shown inasmuch as it forms no part of the present invention. In lathes of this general type the work is positioned upon the work holder W and the table T is caused to be advanced and retracted to and from the work, consequently carrying the cutter during the cutting operation into the work and subsesuently withdrawing it. It is upon the mechanism for advancing and retracting the table T that my invention pertains.

Suitably supported longitudinally of the lathe and adjacent one side thereof is a constantly driven shaft 10. This shaft may be mounted in suitable brackets (not shown) and rotated constantly in one direction from a source of power (not shown. Rigidly secured to the table T and depending therefrom are two plates 11 and 12, which coöperate to form a housing or apron in which most of the operating parts of this mechanism are placed.

Mounted in this housing is a shaft 13 which has keyed thereto a gear 14. A second gear 15 journaled upon a shaft 16 operatively meshes with the gear 14. This gear 15 is in mesh with a pinion 17, likewise journaled upon a shaft 18 and keyed thereto. A rack bar 19 is rigidly secured to the under side of the base B, at one edge thereof. The shaft 18 extends through the rear place 12 of the housing and has keyed thereto a second pinion 20, which is adapted to constantly engage the rack bar 19. A sleeve 21 may extend from the rear plate 12 to assist in supporting the projecting end of the shaft 18. When power is applied to the train of gears just described, the housing containing these gears, together with the table T, will be caused to travel longitudinally of the lathe, as is obvious.

The inner end of the shaft 13 extends through the rear plate 12 and has keyed thereto a bevel gear 22. This gear is in position to be alternately engaged by a pair of bevel gears, which will cause this gear 22 to be rotated in a forward or a reverse direction, in a manner to be more fully hereinafter described.

A sleeve 23 is slidably mounted upon the shaft 10, but keyed to rotate therewith. This sleeve carries a pair of bevel gears 24, which are adapted to alternately engage with the gear 22. In order to insure the constant meshing of either of the gears 24 with the gear 22, I provide a latch mechanism. This latch mechanism comprises a latch housing 25, which is secured to the rear plate 12 by means of screws 26. Slidably supported by this latch housing 25 is a sleeve 27, provided with a pair of upstanding arms 28. These arms 28 are apertured so that they may engage the shaft 10 and travel longitudinally thereof with the housing 11—12. These arms 28 lie immediately adjacent the pair of bevel gears 24 and are adapted to shift these gears when longitudinal pressure is applied to either end of the sleeve 27.

Slidably mounted within the sleeve 27 is a latch bar 29 having, each of its ends provided with a knob 30. The latch bar 29 is also provided with two recesses or depressions 31. The sleeve 27 is likewise provided with a pair of apertures 32, positioned to register with the depressions 31 of the latch bar 29. Mounted in the latch casing 25 is a spring-pressed plunger 33, normally forced to the position illustrated in Fig. 4 by a spring 34. When a depression 31 of the latch bar 29 is in register with an aperture 32, the plunger 33 will be projected through the aperture 32 and into the depression 31, thereby forming a positive lock for the slidable sleeve 27, which, in turn, through the medium of one of the arms 28, will retain a gear 24 in mesh with the gear 22. If, however, the latch bar 29 is moved longitudinally with respect to the sleeve 27, the spring plunger 33 will be correspondingly displaced from the recess 31 and its end will abut the surface of the latch bar 29, thereby half unlatching this locking mechanism and locking the sleeve 27 to the latch casing 25 only by reason of the engagement of the spring-pressed plunger 33 of the aperture 32. It should be noted that the walls of this aperture 32 are beveled outwardly in such a manner that when a sufficient pressure is applied longitudinally to the sliding sleeve 27 the plunger will be displaced, and this sleeve, together with the bevel gears 24, shifted longitudinally.

In order to apply the proper longitudinal pressure upon the sliding sleeve 27 and to release the latch bar 29, I provide two pairs of telescoping members 35. Each pair of these telescoping members comprises a sleeve 36 surrounding the shaft 10 and secured in position upon the shaft by a set-screw 37. Telescoping in this sleeve 36 is a second sleeve 38. A spring 39 is interposed between the two members 36 and 38 and normally retains the sleeve 38 in its extended position, as illustrated in Fig. 4. The sleeve 36 is provided with a latch-operating lip 40 adapted to engage the latch bar 29 to slide the same longitudinally, in a manner to be more fully hereinafter described.

If for any reason it is desirous to manually move the table T, this may be accomplished by actuating a hand wheel 41 mounted upon a shaft 42. A pinion 43 is keyed to the inner end of the shaft 42 and meshes with a gear 44, which in turn meshes with the pinion 17 of the train of gears described hereinbefore. In this manner the table T may be moved toward and from the work manually.

I will now describe the means for automatically operating my invention. Assume that the table T, with the housing 11—12 and the appurtenant parts thereof, is traveling to the left, as viewed in Fig. 4. The table T is caused to travel in this direction by the constantly driven shaft 10, which operates bevel gear 24, which in turn meshes with the bevel gear 22. The power is then transmitted through the train of gears 14—15 and pinions 17—20, the pinion 20 meshing with the rack bar 19, which is stationary upon the bed B of the lathe. During the travel to the left, one of the arms 28 of the sliding sleeve 27 will engage the projecting sleeve 38 of the telescoping member 35, and upon continued travel will telescope the sleeve 38 into the member 36 and consequently compress the spring 39. In this manner a pressure is built up against the sliding sleeve 27 which will tend to move this member 27 to the right to shift the gears 24. During the compression of the spring 39, however, the knob 30 of the latch bar 29 will be engaged by the latch-operating lip 40, and this latch bar 29 will thereby be moved to the right to disengage the end of the latch 33 from the depression 31. After this movement of the latch bar 29 the spring latch 33 will be in engagement only with the aperture 32 of the sliding sleeve 27. As the table T moves farther to the left, the spring 39 will be put under a greater tension and the pressure built up therein will be sufficient to force the sliding sleeve 27 to the right, thereby displacing the spring latch 33 from the aperture 32. The tension of the spring 39 upon the projecting sleeve 38 will be sufficient to move the sliding sleeve 27, and consequently the other bevel gear 24 to a position where it will engage the bevel gear 22. This engagement of the bevel gear 24 with the gear 22 will cause the train of gears connected thereto to move in a reverse direction, therefore reversing the travel of the table T and causing the same to move to the right, as viewed in Fig. 4. In order to positively limit the longitudinal travel of the sliding sleeve 27, depending arms 45 may be formed upon the sleeve 27, which coöperate with projections 46 carried by the latch casing 25.

From the foregoing it is obvious that one of the bevel gears 24 will be held in mesh with the bevel gear 22 until the housing 11—12 and table T have moved to the end of their travel in one direction. At this time a maximum pressure will have been built up by the spring 39, and just prior to the accumulation of this maximum pressure the latch bar 29 will have been moved to disengage the spring latch 33 from the depression 31 in this latch bar. Immediately thereafter, when the maximum pressure has been reached, the pressure will be sufficient to quickly move the sliding sleeve 27 with the bevel gears 24 longitudinally, thereby disengaging one of the gears 24 and causing the other to mesh with the bevel gear 22. This shifting is more in the nature of a snap motion, and such a shifting action is highly desirable in a device of this sort, inasmuch as the gears may be shifted and a reverse motion set up without any appreciable loss of time. When the spring 39 has shifted the slidable gears to the right, the latch bar 29 will have been moved to its extreme right-hand position and the spring latch 33 will engage the other depression 31 in the latch bar 29 through the other aperture 32 in the sleeve 27.

It should be understood that while I have illustrated this invention as applied to one type of lathe, I am not necessarily limited by reason of this, inasmuch as my invention is equally applicable to many other types of lathes. It should also be understood that this invention may be applied to any type of machine where a quick shift automatic reverse is needed.

Various modifications may be made in the specific structure of my invention without departing from the spirit and scope thereof, and I particularly reserve this right.

Having thus described my invention, what I claim is:—

1. A device of the class described, comprising a stationary rack, a movable housing, a train of gears mounted in said housing and meshing with said rack, a pair of shiftable gears, telescoping members, a spring interposed between said members, and means for compressing said spring to cause said telescoping members to shift the movable gears.

2. A device of the class described, comprising a stationary rack, a movable housing, a train of gears mounted in said housing and meshing with said rack, a pair of shiftable gears, two pairs of telescoping members, a spring in connection with each pair of telescoping members, means for compressing said spring and telescoping members, a latch member, and means for releasing said latch member and shifting said gears.

3. A device of the class described, comprising a stationary rack, a movable housing, a train of gears in said housing meshing with said rack, a constantly driven shaft, a pair of gears keyed to said shaft and slidable thereon, two pairs of telescoping members upon said shaft, a spring in connection with each pair of telescoping members adapted to maintain the telescoping members in extended position, and means for telescoping the members and compressing the spring, said spring being adapted to shift the slidable gears at a predetermined time.

4. A device of the class described, comprising a stationary rack, a movable housing, a train of gears in said housing meshing with said rack, a constantly driven shaft, a pair of gears keyed to said shaft and slidable thereon, two pairs of telescoping members upon said shaft, a spring in connection with each pair of telescoping members adapted to maintain the telescoping members in extended position, means for telescoping the members and compressing the spring, said spring being adapted to shift the slidable gears at a predetermined time, a latch mechanism, means for partially disengaging said latch.

5. A device of the class described, comprising a stationary rack, a movable housing, a train of gears in said housing, a main bevel gear in said train of gears, a constantly driven shaft, a pair of bevel gears adapted to mesh with said main bevel gear, said pair of bevel gears being keyed to said shaft and slidable thereon, a pair of telescoping members on said shaft, one of said members being rigidly secured to said shaft, a spring for projecting the other telescoping member, a latch casing, a sliding sleeve mounted in said latch casing, a latch bar slidably supported in said sleeve, said latch bar being provided with depressions and said sliding sleeve being provided with registering apertures, a spring-pressed latch member adapted to engage in said apertures and depressions, means on one of said telescoping members for sliding said latch bar, said spring being adapted to shift said slidable bevel gears.

6. A device of the class described comprising a stationary rack, a movable apron, a train of gears mounted in said apron and meshing with said rack, said train of gears including a pair of shiftable gears and means dependent on the movement of said apron for automatically accumulating pressure for shifting said gears.

7. A device of the class described comprising a stationary rack, a movable apron, a train of gears mounted in said apron and meshing with said rack, said train of gears including a pair of shiftable gears, two pressure accumulators disposed in the path of travel of said movable apron and means operatable by the movement of said apron for causing one of said pressure accumulators to function, the pressure thus accumulated shifting said shiftable gears.

MONROE G. HUSTED.